Patented Jan. 16, 1951

2,538,273

UNITED STATES PATENT OFFICE 2,538,273

METHOD OF INCREASING THE PARTICLE SIZE OF SYNTHETIC RESIN LATICES

Chester E. Rhines, Glen Rock, N. J., assignor to United States Rubber Company, New York, N. Y., a corporation of New Jersey No Drawing. Application November 14, 1947,
Serial No. 786,144

16 Claims. (Cl. 260—96)

The present invention relates to increasing the size of the dispersed polymer particles in aqueous dispersions of water-insoluble synthetic resins produced by the emulsion polymerization of polymerizable unsaturated monomeric material.

The manufacture of aqueous dispersions of various synthetic resins by the polymerization of resin forming polymerizable monomeric material, such as polymerizable monoolefines and diolefines and mixtures thereof in aqueous emulsion in the presence of emulsifying agents, commonly called resin latices, or simply latices, is well known. Conventionally, such latices may be prepared with soaps as the emulsifying agents, giving latices with a pH of 9 or over. The average particle size of such latices is very small and it is often desired to enlarge the dispersed polymer particles where the latex is to be concentrated as by centrifuging or creaming, or where the latex is to be used, directly or after concentrating, in spreading or dipping operations. For the same content of soap stabilizer, increasing the particle size of the emulsion polymerizate lowers the viscosity and surface tension of the latex, giving improved centrifuging and creaming and better spreading and dipping. The particle size of such soap dispersed resin latices is commonly increased by adding a salt to the latex, and/or by forming a salt in-situ by adding an acid to a pH of 7.5 or less, and thereafter adding a base, e. g. alkali-metal or ammonium hydroxide, or an amine, to raise the pH of the latex to 9 or over to prevent the continued increase in particle size with subsequent destabilization.

According to the present invention, the amount of acid and/or salt necessary to increase the particle size of a soap-dispersed synthetic resin latex a given amount where an acid, or acid and salt, is incorporated in the latex, is materially reduced, thereby minimizing the tendency to cause destabilization and local coagulation of the latex on the acid, or acid and salt, addition.

In carrying out the present invention, the particle size of a synthetic resin latex containing soap as a dispersing agent and having a pH of 9 or over is increased by the incorporation therein of a small amount of acid, or acid and salt, in the presence of a small amount of an alcohol, and thereafter raising the pH of the latex to at least 9.

The soap used as an emulsifying and dispersing agent in the preparation of the synthetic resin latices to which the present invention is applicable may be one or a mixture of alkali soaps of soap-forming mono-carboxylic acids having 10 to 20 carbon atoms per molecule. Such a soap-forming acid may be a member of the saturated fatty acid series ($C_nH_{2n}O_2$), or of the unsaturated fatty acid series ($C_nH_{2n-2}O_2$) or ($C_nH_{2n-4}O_2$), or may be abietic acid (including the so-called hydrogenated abietic acid, dehydrogenated abietic acid, or polymerized abietic acid). Examples of such soap-forming acids of the fatty acid series are capric, undecenoic, lauric, myristic, palmitic, margaric, stearic, oleic, linoleic and arachidic acids. The soaps may be alkali metal, ammonium or amine soaps. The term "alkali soap" is used herein in its commonly accepted sense as referring to alkali-metal, ammonium and amine soaps and is exclusive of the alkaline-earth and other polyvalent metal salts of soap-forming acids. The term "alkali" as in "alkali salt" is similarly used herein as referring to alkali-metal, ammonium and amine radicals, and is exclusive of alkaline-earth and other polyvalent metal radicals. The alkali soap used as an emulsifying agent for the monomers in the emulsion to be polymerized and as a dispersing agent for the polymer particles in the latex will generally be present in amounts from 3 to 8% by weight of the solids of the latex, although larger amounts of soap may be used, and the pH of the resin latex will be at least 9 and may be as high as 12 or over depending on the specific alkali in the soap and the amount, if any, excess alkali used. The latex may, if desired, contain other types of surface-active agents which are sometimes used to supplement soaps in emulsion polymerizations, generally where the amount of soap used is relatively low, such as the alkali-metal salts of sulfonated or sulfated hydrophilic organic bodies, e. g. sodium salt of isopropyl naphthalene sulfonic acid, dodecyl benzene sodium sulfonate, sodium lauryl sulfate, or the reaction products of ethylene oxide with higher alcohols (e. g. oleyl alcohol) or with alkylated phenols (e. g. isopropyl phenol).

The alcohols which will effect an increased particle enlargement of the synthetic resin latex on reduction of the pH by the addition of the acid, or acid and salt, and then raising the pH, or, as a corollary, will cause the same particle enlargement on the addition of less acid or salt or both, and subsequent raising the pH, are the aliphatic (including cycloaliphatic) alcohols, e. g. methyl, ethyl, propyl, butyl, amyl, hexyl, cyclohexyl, and octyl alcohols. The alcohol may be added to the emulsion of monomers before polymerization, or it may be added to the latex after preparation. The amount of alcohol added is not critical, and may be from 0.1 to 5% by weight of the synthetic resin latex. The alcohol in the synthetic resin latex acts as a stabilizer for the soap-dispersed resin particles at the usual pH's of 9 and above, but when the pH is lowered to 7.5 or under, as by the addition of the acid, the alcohol then becomes a destabilizer and causes increased particle enlargement. The amount of acid incorporated in the latex should be that which will lower the pH of the resin latex to 7.5 or under, in order that the alcohol will cause the increased particle enlargement, but the pH should not be lowered to below 4.5 because of tendency towards coagulation at such low pH's. The pH may be reduced from 9 to within the range of 4.5 to 7.5 by adding acid to the resin latex. Weak acids are preferred since it is difficult to add a strong acid without local coagulation. Carbon dioxide may be bubbled into the latex directly, and acids, such as formic acid and acetic acid may be added as dilute aqueous solutions. The salt which may be incorporated in the latex with the acid in order to aid in the particle enlargement may be an alkali salt of a strong acid or a weak acid, e. g. sodium chloride or ammonium acetate. It is, of course, known that the addition of a salt to synthetic resin latex will cause an increase in particle size, but the salt addition in the present case is considered as ancillary to the improvement in particle size enlargement by incorporating acid in the latex in the presence of alcohol and thereafter raising the pH to above 9. If a salt is added in addition to the acid, the amount of such salt will generally be not more than 3% by weight of the latex solids. The salt may be added as a dilute aqueous solution to minimize local coagulation.

The present invention is applicable to the particle enlargement generally of synthetic resin latices which are aqueous emulsion polymerizates of polymerizable unsaturated monomers. Examples of such polymerizable unsaturated monomers for the preparation of synthetic resin latices by emulsion-polymerization are one or a mixture of polymerizable monomers containing a terminal $CH_2=C<$ group where at least one of the disconnected valences is attached to an electronegative radical, that is, a radical which substantially increases the electrical dissymmetry or polar character of the molecule, e. g. phenyl, halogen, carbonitrilo, acetoxy, and carboxy radicals, and one or more such polymerizable monomers containing a terminal $CH_2=C<$ group with isobutylene. Examples of such polymerizable monomers containing a terminal $CH_2=C<$ group are arylolefins, e. g., styrene, vinylnaphthalene, alpha-methylstyrene, p-methylstyrene, p-chlorostyrene, dichlorostyrenes; the alpha-methylene carboxylic acids, and their esters, nitriles and amides, e. g., acrylic acid, methacrylic acid, methyl acrylate, methyl methacrylate, methyl ethacrylate, ethyl acrylate, ethyl methacrylate, ethyl ethacrylate, acrylonitrile, methacrylonitrile, acrylamide, methacrylamide; vinyl esters of alkanoic acids, e. g., vinyl formate, vinyl acetate, vinyl propionate, vinyl butyrate; vinyl pyridine; vinyl chloride; vinylidene chloride; alkyl vinyl ethers, e. g., methyl vinyl ether, ethyl vinyl ether; alkyl vinyl ketones, e. g., methyl vinyl ketone, ethyl vinyl ketone. Other examples of polymerizable unsaturated monomers for the preparation of synthetic resin latices by emulsion polymerization are mixtures of one or more polymerizable monomers containing a terminal $CH_2=C<$ group where at least one of the disconnected valences is attached to an electronegative radical, with one or more conjugated diolefines, such as butadienes-1,3, e. g., butadiene-1,3, methyl-2-butadiene-1,3 (isoprene), chloro-2-butadiene-1,3 (chloroprene), piperylene, 2,3-dimethyl-butadiene-1,3. Further examples of polymerizable unsaturated monomers are one or a mixture of such conjugated diolefines. Such polymers of butadienes-1,3, and of mixtures of butadienes-1,3 with up to 70% (on the mixture) of such polymerizable monomers containing a terminal $CH_2=C<$ groups, are so-called synthetic rubbers, and the corresponding aqueous emulsion polymerizates are so-called synthetic rubber latices. The average particle diameter of such synthetic rubber latices containing the conventional 3 to 8% of soap based on the latex solids, and similarly of a large number of other types of synthetic resin latices containing 3 to 8% of soap based on the latex solids, and prepared by emulsion polymerization, is about 0.1 micron, the particles being very uniform in size. The average particle diameter of about 0.1 micron is thus the number-average as well as the volume-average particle size. The size of the particles in natural Hevea latex varies from a diameter of 0.5 micron or less to 2 to 3 microns, the particles having diameters less than 0.5 micron (from 0.1 to 0.5 micron) being present in very large numbers, i. e., over 90% of the total number of the rubber particles, but accounting for only a small proportion, i. e., less than 20%, of the total mass or volume of the rubber particles. The number-average particle diameter of Hevea latex according to Lucas, "Ultraviolet Microscopy of Hevea Rubber Latex," Ind. and Eng. Chem., vol. 30, pp. 146–153 (1938) and Kemp "Composition and Structure of Hevea Latex," id. pp. 154–158, is 0.26 micron, due to the 90 or more precent of the particles of small size (less than 0.5 micron) which make up for less than 20% of the mass or volume of the rubber. The predominating mass or volume of the rubber in Hevea latex is in the form of particles of over 0.5 micron diameter, giving a volume-average particle diameter according to Lucas of 0.89 micron. The dispersed particles in a dispersion having diameters of 0.5 micron and over are clearly visible with a light microscope at a magnification of about 500 diameters, (e. g. at 480× magnification as used in the examples below), and hence the great mass of rubber particles in natural latex are visible with such a light microscope. The dispersed particles in synthetic resin latices which have diameters of around 0.1 micron are not visible with a light microscope at about 500 diameters magnification. We thus have a simple method of following the particle enlargement in such synthetic resin latices where the particles are enlarged from sub-visible size to visible size (0.5 micron and over) as viewed under the light microscope. This is a ready method of comparing the effect of various particle enlargement methods. Such method of comparing the increase in particle size by the process of the present invention with the increase in particle size, if any, where the alcohol is omitted from the acid, or acid and salt treatment of the synthetic resin latex, is used in the following examples, which illustrate the invention. In the examples, all parts recited are by weight.

Example I

A 30% solids commercial synthetic rubber latex which was prepared by polymerizing an aqueous emulsion containing 75 parts of butadiene-1,3, 25 parts of styrene, about 5 parts of sodium stearate (emulsifying agent), and a small amount of conventional oxidizing catalyst, was used in Examples I to IX. The latex had a pH of 9.2 and an average particle diameter of about 0.1 micron. To a portion of the latex was added 1% of the latex weight of n-amyl alcohol. To 25 grams of the alcohol treated latex and 25 grams of the latex without the alcohol were added 5 cc. of 4% aqueous sodium chloride and 8 cc. of 1% aqueous acetic acid, reducing the pH to 5.9. After standing one-half hour, aqueous ammonia was added to each latex sample to bring the pH to 10.0. Examination under the microscope at 480× magnification showed no detectable increase in visible particles in the sample from which the alcohol was omitted, whereas examination showed that Hevea sized particles had formed in the sample containing the alcohol. Examination in this and in the following examples were made with a light microscope at a magnification of 480 diameters.

Example II

Example I was repeated with cyclohexanol with the same results.

Example III

To a portion of the latex of Example I was added 1% of the latex weight of cyclohexanol. To 25 grams of the alcohol-treated latex and to 25 grams of latex without the alcohol addition was added 5 cc. of 4% aqueous sodium chloride solution, and 0.25% aqueous formic acid was run in until the pH of the latices was reduced to 5.3. After standing one-half hour, the pH of the latices was raised to 10.0 by the addition of aqueous ammonia. Hevea size particles formed in the sample containing the alcohol, whereas there was no detectable increase in visible particles in the sample to which the alcohol had not been added.

Example IV

To 25 grams of the latex to which 1% of cyclohexanol had been added in Example III, and to a separate 25 gram portion of the latex not treated with the alcohol, was added 6 cc. of 4% aqueous ammonium acetate solution followed by 8 cc. of 1% aqueous acetic acid, lowering the pH to 6.1. After standing one-half hour, the pH was raised to 10.0 by the addition of aqueous ammonia. Hevea sized particles formed in the the sample to which the cyclohexanol had been added, whereas there was no detectable increase in visible particles in the sample to which alcohol had not been added.

Example V

To 25 grams of the latex to which 1% cyclohexanol had been added in Example III, and to a separate 25 grams of latex not treated with the alcohol, was added 9 cc. of 4% aqueous sodium chloride solution, and then the samples were saturated with carbon dioxide gas at 5° C., giving a pH of 6.9. After standing one-half hour, aqueous ammonia was added to each sample to bring the pH to 10.2. Hevea particles formed in the alcohol treated sample, whereas there was no detectable increase in visible particles in the sample not treated with alcohol.

Example VI

To a portion of the latex of Example I was added 1% of the latex weight of 1-hexanol. To 25 grams of the alcohol treated latex and to 25 grams of the latex not treated with alcohol, was added 3 cc. of a 4% aqueous sodium chloride solution and 10 cc. of 1% aqueous acetic acid lowering the pH to 6.9. After standing one-half hour, aqueous ammonia was added to each of the latex samples to bring the pH to 10.0. Hevea sized particles formed in the sample containing the alcohol, whereas there was no detectable increase in visible particles in the sample where alcohol had not been added.

Example VII

To four separate portions of the latex of Example I were added 1% of the latex weight of 1-pentanol, cyclohexanol, 2-ethyl-1-hexanol and 1-butanol, respectively. To 25-gram samples of each of the alcohol treated latices and to 25-gram control samples of the latex without alcohol addition was added 5 cc. of 4% aqueous sodium chloride solution and 8 cc. of 1% aqueous acetic acid, reducing the pH in the samples to 5.8 to 6.0. After one-half hour standing, aqueous ammonia was added to raise the pH of the samples to 10.0. Hevea size particles formed in each of the latices containing the added alcohol, whereas there was no detectable increase in visible particles in the samples to which alcohol had not been added.

Example VIII

To three separate portions of the latex of Example I were added 3.3% of the latex weight of methanol, ethanol, and 2-propanol, respectively. To a 25-gram portion of each of the alcohol-treated latices and to 25-gram control portions of the latex not treated with an alcohol, was added 5 cc. of 4% aqueous sodium chloride solution and 8 cc. of 1% aqueous acetic acid, lowering the pH in the samples to 5.9. After standing one-half hour, ammonia was added to the samples to raise the pH to 10.0. In the three cases where alcohol had been added, Hevea size particles formed, whereas in the samples to which no alcohol had been added, no detectable increase in visible particles occurred.

Example IX

To 300 grams of the latex of Example I was added three grams of cyclohexanol. To the thus treated latex and to a 300 gram sample of the latex of Example I not treated with an alcohol, was added 60 cc. of 4% aqueous sodium chloride solution and 96 cc. of 1% aqueous acetic acid, lowering the pH to 5.9. After a half hour standing, ammonia was added to each of the samples to increase the pH to 10.0. The sample to which the cyclohexanol had been added showed visible particle enlargement, whereas the sample to which an alcohol had not been added showed no detectable increase in visible particles.

To a portion of each of the above treated latex samples was added 0.1% ammonium alignate creaming agent on the water phase. The samples were allowed to stand at room temperature for 18 hours. The sample to which the cyclohexanol sodium chloride and acetic acid had been added, creamed, showing a distinct cream line, whereas the sample to which the sodium chloride and acetic acid had been added but from which the alcohol had been omitted, showed no evidence of cream. The top one-third of each sample was analyzed for total solids. The top one-third of the sample which had been enlarged by the acid and salt in the presence of cyclohexanol analyzed 53.2% solids content. The top one-third of the sample which was not enlarged on the addition of acid and salt in the absence of the cyclohexanol analyzed 20.3% solids content.

A portion of the above latex treated with the cyclohexanol, acid and salt was placed in a 50 cc. centrifuge tube. A portion of the above latex treated with the acid and salt in the absence of the cyclohexanol was placed in another 50 cc. centrifuge tube. The tubes were whirled for three minutes. The cyclohexanol treated latex separated into cream and clear serum phases. No detectable separation occurred in the latex to which the alcohol had not been added.

*Example X*

1500 grams of synthetic rubber latex were prepared according to the following formulation: 50 parts styrene, 50 parts butadiene, 150 parts of 3% aqueous solution of potassium oleate, 0.1 part potassium peroxysulfate (catalyst), and 0.5 part dodecyl mercaptan (regulator). Polymerization was carried out for 15 hours at 50° C., giving an 81% conversion. The latex was washed from the reaction bottles with a small portion of rinse water. The product was a 30% total solids latex having an average particle diameter of about 0.1 micron.

To 100 grams of the above latex was added 100 grams of 0.25% aqueous potassium oleate solution, 30 grams of styrene, 2 grams of cyclohexanol and 0.1 gram of tert.-butylhydroperoxide (catalyst). To another 100-gram sample of the above latex was added 100 grams of 0.25% aqueous potassium oleate solution, 30 grams of styrene and 0.1 gram of tert.-butylhydroperoxide, but no cyclohexyl alcohol. 22 grams of 1% acetic acid was added to each mixture with stirring, lowering the pH to 5.7. After one-quarter hour, 1 cc. of 10% aqueous ammonia was added to each mixture to raise the pH to 9.1. The particles were found to have enlarged to the Hevea size range in the sample containing the cyclohexanol, but there was no detectable increase in visible particles in the sample where the alcohol had been omitted. 30 grams of butadiene were then added to each of the thus treated dispersions in closed vessels and polymerization was again started at 50° C. and was continued until 81% conversion of monomers. Dimethylamine was added before and during removal of unreacted polymers to stabilize the latices. The final latices were about 23% solids concentration. The latex from the sample to which the cyclohexanol had been added contained an unusual number of definitely visible particles, grading downward from Hevea sized particles to barely visible particles under 480x magnification in the light microscope. In the latex from the sample to which the alcohol had not been added, there was no detectable particle enlargement over that of ordinary synthetic rubber latex.

*Example XI*

A styrene-acrylonitrile copolymer latex was prepared by polymerizing an aqueous emulsion of the following formulation: 75 parts styrene, 25 parts acrylonitrile, 5 parts sodium stearate, 0.2 part potassium persulfate, 1 part dodecyl mercaptan, and 194 parts water. A second latex was made from the same formulation but with the inclusion of 3 parts of cyclohexanol in the emulsion of monomers. The latices were adjusted to 30% total solids. The average particle diameter of each of the latices was about 0.1 micron. The pH of each latex was 9.3. 50 parts of dibutyl phthalate (plasticizer) were incorporated in each latex.

To 25 grams of each of the above latices was added 4 cc. of 4% aqueous sodium chloride solution and 8 cc. of 1% aqueous acetic acid, lowering the pH's to 5.9. Examination with the light microscope at a magnification of 480 diameters disclosed easily visible particles (0.5 to 1 micron diameter) in the latex containing the cyclohexanol to which the sodium chloride and acetic acid had been added, whereas examination disclosed no visible particles in the latex which did not contain alcohol and to which the sodium chloride and acetic acid had been added. Ammonia was added to each of the samples to raise the pH to over 10. The large particles persisted in the latex containing the alcohol.

*Example XII*

A polystyrene latex was prepared by polymerizing an aqueous emulsion of the following formulation: 100 parts styrene, 5 parts sodium stearate, 0.2 part potassium persulfate, 1 part dodecyl mercaptan, and 194 parts water. A second latex was made from the same formulation but with the inclusion of 3 parts of cyclohexanol in the emulsion of monomers. The latices were adjusted to 30% total solids. The average particle diameter of each of the latices was about 0.1 micron. The pH of each latex was 9.6. 50 parts of dibutyl phthalate were incorporated in each latex.

To 25 grams of each of the above latices was added 4 cc. of 4% aqueous sodium chloride solution and 8 cc. of 1% aqueous acetic acid, lowering the pH's to 6.0. Large particles (0.5 to 1 micron diameter) formed in the latex containing the cyclohexanol to which the sodium chloride and acetic acid had been added. These large particles remained when ammonia was added to the latex to raise the pH to 9.9. The latex which did not contain alcohol underwent no detectable change in particle size on addition of the sodium chloride and acetic acid, or on the subsequent addition of ammonia to a pH of 9.9.

*Example XIII*

An isoprene-styrene-acrylonitrile interpolymer latex was prepared by polymerizing an aqueous emulsion of the following formulation: 60 parts isoprene, 20 parts styrene, 20 parts acrylonitrile, 5 parts of sodium stearate, 0.2 part potassium persulfate, 1 part dodecyl mercaptan and 194 parts water. A second latex was made from the same formulation but with the inclusion of 3 parts of cyclohexanol in the emulsion of monomers. The latices were adjusted to 30% total solids. The average particle diameter of each of the latices was about 0.1 micron. The pH of each latex was 9.5.

To 25 grams of each of the above latices was added 4 cc. of 4% aqueous sodium chloride solution and 10 cc. of 1% aqueous acetic acid, lowering the pH's to 5.9 and 5.8 for the latices with and without the cyclohexanol, respectively. Large particles (0.5 to 1 micron diameter) formed in the latex containing the cyclohexanol to which the sodium chloride and acetic acid had been added. These large particles remained when ammonia was added to the latex to raise the pH to 9.9. The latex which did not contain alcohol underwent no detectable change in particle size on addition of the sodium chloride and acetic acid, or on the subsequent addition of ammonia to a pH of 9.9.

*Example XIV*

A polyisoprene latex was prepared by polymerizing an aqueous emulsion of the following formulation: 100 parts isoprene, 5 parts sodium stearate, 0.2 part potassium persulfate, 1 part dodecyl mercaptan and 194 parts water. A second latex was made from the same formulation but with the inclusion of 3 parts of cyclohexanol in the emulsion of monomers. The latices were adjusted to 30% total solids. The average particle diameter of each of the latices was about 0.1 micron. The pH of each latex was 9.6.

To 25 grams of each of the above latices was added 4 cc. of 4% aqueous sodium chloride solution and 8 cc. of 1% aqueous acetic acid, lowering the pH's of each latex to 6.0. Large particles (0.5 to 1 micron diameter) formed in the latex containing the cyclohexanol to which the sodium chloride and acetic acid had been added. These large particles remained when ammonia was added to the latex to raise the pH to 10.2. The latex which did not contain alcohol underwent no detectable change in particle size on addition of the sodium chloride and acetic acid, or on the subsequent addition of ammonia to a pH of 10.2.

*Example XV*

A methylmethacrylate polymer latex was prepared by polymerizing an aqueous emulsion of the following formulation: 100 parts methylmethacrylate, 5 parts sodium stearate, 0.2 part potassium persulfate, 1 part dodecyl mercaptan and 194 parts of water. A second latex was made from the same formulation but with the inclusion of 3 parts of cyclohexanol in the emulsion of monomers. The latices were adjusted to 30% total solids. The average particle diameter of each of the latices was about 0.1 micron. The pH of each latex was 9.2. 25 parts of dibutyl phthalate were incorporated in each latex.

To 25 grams of each of the above latices was added 5 cc. of 4% aqueous sodium chloride solution. Carbon dioxide was then bubbled through each latex, lowering the pH's in each case to 7.0. Large particles (0.5 to 1 micron diameter) formed in the latex containing the cyclohexanol to which the sodium chloride and acetic acid had been added. These large particles remained when ammonia was added to the latex to raise the pH to 10.0. The latex which did not contain alcohol underwent no detectable change in particle size on addition of the sodium chloride and acetic acid, or on the subsequent addition of ammonia to a pH of 10.0.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. The method of increasing the size to an average particle diameter greater than 0.5 micron of the dispersed polymer particles in an aqueous dispersion of a water-insoluble resin, which dispersion is produced by the aqueous emulsion polymerization of polymerizable unsaturated monomeric material selected from the group consisting of polymerizable monoolefines and polymerizable diolefines and mixtures thereof, said dispersion containing 3 to 8 parts by weight of alkali soap per 100 parts of solids of the dispersion and having a pH of at least 9, which comprises reducing the pH of the dispersion to within the range of 4.5 to 7.5 in the presence of 0.1 to 5% of an alcohol selected from the group consisting of aliphatic and cycloaliphatic alcohols based on the weight of the dispersion, and thereafter increasing the pH of the dispersion to at least 9 whereby to increase the average particle diameter of the dispersed polymer particles in the dispersion to over 0.5 micron.

2. The method of claim 1 in which the alcohol is an aliphatic alcohol having up to 8 carbon atoms.

3. The method of claim 1 in which the alcohol is cyclohexanol.

4. The method of claim 2 in which the pH of the dispersion is reduced to 4.5 to 7.5 by incorporating an acid in the dispersion.

5. The method of claim 2 in which the pH of the dispersion is reduced to 4.5 to 7.5 by addition of acetic acid to the dispersion.

6. The method of claim 2 in which the pH of the dispersion is reduced to 4.5 to 7.5 by addition of formic acid to the dispersion.

7. The mthod of claim 2 in which the pH of the dispersion is reduced by addition of carbon dioxide to the dispersion.

8. The method of claim 2 in which the pH of the dispersion is reduced to 4.5 to 7.5 by incorporating an acid in the dispersion, and the pH is thereafter raised to at least 9 by adding to the dispersion a base of the group consisting of alkali-metal hydroxides, ammonium hydroxide and amines.

9. The method of increasing the size to an average particle diameter greater than 0.5 micron of the dispersed polymer particles in an aqueous dispersion of a water-insoluble resin, which dispersion is produced by the aqueous emulsion polymerization of polymerizable unsaturated monomeric material selected from the group consisting of polymerizable monoolefines and polymerizable diolefines and mixtures thereof, said dispersion containing 3 to 8 parts by weight of alkali soap per 100 parts of solids of the dispersion and having a pH of at least 9 which comprises adding to the dispersion up to 3% by weight of an alkali salt based on the dispersion solids and reducing the pH of the dispersion to within the range of 4.5 to 7.5 in the presence of 0.1 to 5% of an alcohol selected from the group consisting of aliphatic and cycloaliphatic alcohols based on the weight of the dispersion, and thereafter increasing the pH of the dispersion to at least 9 whereby to increase the average particle diameter of the dispersed polymer particles in the dispersion to over 0.5 micron.

10. The method of claim 9 in which the alcohol is an aliphatic alcohol having up to 8 carbon atoms.

11. The method of claim 9 in which the alcohol is cyclohexanol.

12. The method of claim 10 in which the pH of the dispersion is reduced to 4.5 to 7.5 by incorporating an acid in the dispersion.

13. The method of claim 10 in which the pH of the dispersion is reduced to 4.5 to 7.5 by addition of acetic acid to the dispersion.

14. The method of claim 10 in which the pH of the dispersion is reduced to 4.5 to 7.5 by addition of formic acid to the dispersion.

15. The method of claim 10 in which the pH of the dispersion is reduced by addition of carbon dioxide to the dispersion.

16. The method of claim 10 in which the pH of the dispersion is reduced to 4.5 to 7.5 by incorporating an acid in the dispersion, and the pH is thereafter raised to at least 9 by adding to the dispersion a base of the group consisting of alkali-metal hydroxides, ammonium hydroxide and amines.

CHESTER E. RHINES.

REFERENCES CITED

The following references are of record in the file of this patent:

UNITED STATES PATENTS

| Number | Name | Date |
|---|---|---|
| 2,444,801 | Arundale | July 6, 1948 |

FOREIGN PATENTS

| Number | Country | Date |
|---|---|---|
| 511,145 | Germany | Oct. 27, 1930 |